3,507,806
MINERAL OIL-WATER GELS
Graham Barker, Fairlawn, and John T. Foley, Verona, N.J., assignors to Witco Chemical Company, Inc., New York, N.Y., a corporation of Delaware
No Drawing. Filed Nov. 2, 1966, Ser. No. 591,413
Int. Cl. B01j 13/00
U.S. Cl. 252—316     9 Claims

ABSTRACT OF THE DISCLOSURE

A substantially clear and transparent gel composition consisting of:
(a) mineral oil
(b) a water-soluble diethanolamide
(c) an oil-soluble diethanolamide
(d) a polyhydroxy fatty acid monoester
(e) a phosphoric acid ester of an ethylene oxide adduct of an alkyl phenol or of an aliphatic monohydric alcohol, or water-soluble salt of such esters, and
(f) water.

---

The present invention relates to mineral oil and water emulsion gels and more particularly to cosmetic compositions in the form of transparent gels of mineral oil and water wherein either water or mineral oil may be the dispersed phase or continuous phase but particularly where water is the continuous phase and mineral oil the dispersed phase, and to methods of making the same.

Mineral oil has long been a prime ingredient for cosmetic compositions such as hair grooming preparations and hand conditioning creams. It offers unique and distinctive advantages for such uses in that it is an effective hair-holding material, has excellent emolliency and lubricity without the tackiness typical of some other oils and synthetic oils, it is bland and inocuous to the skin and, finally, it is highly resistant to air oxidation and rancidity.

Water is also an important ingredient in such cosmetic compositions, being valuable as a temporary diluent that can appreciably aid in spreading the preparation.

Highly viscous or solid creams or gels of mineral oil in water are well known and have many advantages over other types of cosmetic composition such as the solid or highly viscous preparations comprising water-in-oil, brilliantines of gum bases. Illustratively, the oil-in-water preparations do not have a greasy feel or leave any stickness as do the brilliantines or water-in-oil preparations.

It has long been recognized that clear mineral oil-water gels would be highly desirable as cosmetic compositions offering such additional advantages as not leaving unsightly films on hair or hands after application and affording many attractive packaging possibilities.

Various cosmetic products that are clear mineral oil-water gels have been evolved and received commercial acceptance, as illustrated in such U.S. patents as Nos. 3,101,300; 3,101,301 and 3,228,842.

The practice of the present invention, hereafter described in detail, results in the product of novel transparent gels of mineral oil and water that are highly effective cosmetic compositions, which have substantial amounts of mineral oil and water, which are transparent and maintain their transparency and homogeneity over prolonged periods of time, which are mild in their reaction to the skin and to which various cosmetic and medicinal adjuvants can also be added without destroying their clarity or stability.

The transparent gels of the present invention contain, as essential ingredients, in the ranges of proportions set forth hereafter, (1) mineral oil, (2) water, (3) certain water-soluble diethanolamides of higher fatty acids, (4) certain oil-soluble diethanolamides of higher fatty acids, (5) certain phosphate ester surfactants, and (6) certain polyhydroxy esters of higher fatty acids.

The water-soluble diethanolamides employed in the compositions of the present invention are the condensation products of diethanolamine and (a) lauric acid methyl ester, myristic acid methyl ester, or coconut oil methyl ester wherein one mol of said fatty acid esters is reacted with about one mol of diethanolamine or (b) the free acid form of lauric acid, myristic acid or coconut oil fatty acids wherein one mol of said fatty acid is reacted with about two mols of diethanolamine. Where clarity or transparency of the compositions is a particular desideratum, it is especially advantageous to use the lauric diethanolamides.

The oil-soluble higher fatty acid diethanolamides employed in the compositions of the present invention are the condensation products of diethanolamine and the free acid form of normally liquid higher fatty acids, particularly oleic acid or vegetable oil fatty acids containing predominately oleic acid, wherein the mol ratio of diethtanolamine to higher fatty acid is about 1:1. Particularly suitable and preferred are the oleic diethanolamides or tall oil diethanolamides.

The phosphate ester surfactants which are utilized in the compositions of the present invention are well known and are exemplified mainly my phosphate esters, notably orthophosphoric acid esters, of ethylene oxide adducts or polyethenoxy ethers of (i) alkyl phenols, particularly mono- or di-alkyl phenols in which the alkyl radical contains from 8 to 12 carbon atoms or (ii) aliphatic monohydric alcohols comprising straight chain and branched chain saturated and unsaturated alcohols containing at least 8 carbon atoms and generally up to 18 carbon atoms, particularly branched chain and fatty alcohols containing from 10 to 14 carbon atoms. The mol ratio of ethylene oxide to the aforesaid alkyl phenols or alcohols is variable within quite wide limits, generally being at least 4 to 20 or more mols of ethylene oxide to one mol of said alkyl phenols, especially 6 to 14 mols of ethylene oxide to 1 of said alkyl phenol or at least 2 to 20 or more mols of ethylene oxide to one mol of said alcohols, especially 2 to 8 mols of ethylene oxide to one mol of said alcohols. These esters are used in their free acid form or in the form of their water-soluble salts, such as the sodium potassium, ammonium or lower amine or alkanolamine salts, of the mono- and/or di-phosphoric acid esters, as the case may be.

The polyhydroxy esters of higher fatty acids which serve as oil-in-water emulsifiers in the compositions of the present invention may be the higher fatty acid monoesters of (a) polyglycerols or (b) polyoxyethylenes or (c) sugars and sugar alcohols. The higher fatty acid constituent of the esters may be either saturated or unsaturated acids containing from 8 to 22 carbon atoms and particularly 16 to 18 carbon atoms. Suitable polyglycerol constituents may contain 2 to 6 glycerine radicals and preferably 3 glycerine radicals and the polyglycerol monoester is preferably the condensation product of one mol of said fatty acid and one mol of said polyglycerol. The polyoxyethylene radical of said polyoxyethylene monoesters may have a molecular weight of from about 200 to 2000 and most suitably about 400. Illustrative examples of the polyoxyethylene esters includes polyethylene glycol 400 monostearate and polyethylene glycol 400 monooleate. The esters of sugars and sugar alcohols are exemplified by sucrose monooleate, sucrose monostearate, sorbitol monooleate, sorbitol monostearate and like esters of mannitol.

Mineral oil is any liquid product of petroleum within the viscosity range of products called oils. While various mineral oils can be utilized, we prefer those oils also known as light petroleum distillate and liquid petrolatums or white mineral oil which have been highly refined and deodorized. The viscosities of the mineral oils are variable but, in general, will fall within the range of about 30 to 500 Saybolt seconds (S.U.S. at 100° F.), and preferably about 50 to 210 Saybolt seconds (S.U.S. at 100° F.). Mineral oils conforming to the U.S. Pharmacopoeia and National Formulary requirements are most suitable and preferred for use in the cosmetic compositions of the present invention.

The gels of this invention may be produced by mixing the requisite quantities of mineral oil, lauric diethanolamide, oleic diethanolamide and polyhydroxy fatty acid ester. This mixture is heated at a temperature of at least about 75° C. and, generally, not higher than about 100° C. and preferably between about 90° C. and 95° C. Requisite amounts of the phosphate ester and water are mixed together, heated to a temperature between about 75° C. and 100° C., and then added slowly with thorough agitation to the mineral oil containing mixture, the temperature being maintained at the above temperature until all the water solution of the phosphate ester has been added. Stirring of the mixture is continued while cooling to about 60° C. to 75° C., at which time the emulsion is ready to pour for packaging.

When it is desired to incorporate additives into the gel, the water-soluble additives are added to the water portion and oil-soluble additives are added to the oil portion prior to admixing. The temperature at which the materials are heated and maintained until the water or water portion has been completely added is critical for the production of a clear gel. To this end, the temperature of the admixture should be maintained above about 75° C. and not higher than about 100° C., and preferably between about 90° C. and 95° C., until the water portion has been completely incorporated into the oil portion. Otherwise the gel will not be completely clear and, in certain cases, may be opaque. Where complete clarity or transparency is not a significant criterion, such temperature control is not material.

The gel compositions of the present invention comprise by weight, from about 5% to 25% of mineral oil and preferably from about 15% to 20% of mineral oil; from about 1% to about 5%, preferably about 3% to 4%, of the aforesaid water-soluble diethanolamides; from about 1% to about 8%, preferably about 4% to 6%, of the aforesaid oil-soluble diethanolamides; from about 1% to about 5%, preferably about 3% to 4%, of the aforesaid polyhydroxy fatty acid ester; from about 8% to about 20%, preferably about 10% to 16%, of phosphate ester; the balance, at least 10% and up to about 65%, being water, there being preferably between about 40% to about 60% of water.

Various supplemental materials may be incorporated into the gel compositions of the present invention provided that the material added is compatible with the composition and, where clarity is a desideratum, that it does not destroy or unduly affect its clarity. Illustratively, minor amounts, e.g., less than about 5% or 10% by weight of the compositions, of additional surfactants such as the following can be added: alkyl aryl sulfonates; ethoxylated fatty alcohols; sulfonated fatty alcohols; sulfonated unsaturated fatty acids; polypropylene glycol oleates; phosphated mono- and diglycerides; and agents effective for contributing to clarity and stability and viscosity modification as, for example, diethanolamine (to about 3%); triethanolamine (to about 3%); propylene glycol (to about 5%); glycerine (to about 5%); citric or sorbic acid (to about 0.5%) and formaldehyde (to about 1%).

The following examples are illustrative of the practice of the present invention but they are not to be construed in any way as limitative of the full scope of the invention, since various changes and modifications can be made in light of the guiding principles and teachings disclosed herein. All parts stated are by weight.

EXAMPLE 1

16 parts of mineral oil (70 SUS at 100° F.), 3 parts of lauric diethanolamide, 4 parts of oleic diethanolamide and 3 parts of polyethylene glycol 400 monooleate are mixed together and heated to between about 80° C. and 100° C. 12 parts of a phosphate ester of ethoxylated nonyl phenol (about 10 mols of ethylene oxide) are added to 60 parts of water which is then heated to between about 80° C. and 100° C. The water portion is then slowly added with agitation to the mineral oil portion which is maintained at a temperature between about 80° C. and 100° C. When all the water has been added, heating is discontinued and agitation is continued while the mixture is allowed to cool to about 65° C., at which time the emulsion can be poured. A clear, transparent mineral oil-water gel was formed.

The lauric diethanolamide used in this example was the condensation product of about one mol of diethanolamine and one mol of lauric acid methyl ester. The oleic diethanolamide employed was the condensation product of about one mol diethanolamine and one mol of the free acid form of oleic acid.

EXAMPLE 2

Clear, transparent mineral-oil-water gels were produced by employing the process of Example 1 with the following ingredients:

| Part A: | Parts | | | |
|---|---|---|---|---|
| Mineral oil | 16 | 16 | 22 | 16 |
| Lauric diethanolamide | 3 | -- | 4 | 3 |
| Coconut oil diethanolamine | -- | 3 | -- | -- |
| Oleic diethanolamide | 6 | 6 | 8 | 6 |
| Polyglycerol monooleate | 3 | -- | -- | -- |
| Polyglycerol monostearate | -- | 3 | -- | -- |
| Polyethylene glycol 400 monolaurate | -- | -- | 4 | -- |
| Polyethylene glycol 400 monostearate | -- | -- | -- | 3 |
| Part B: | Parts | | | |
| Phosphate ester of ethoxylated nonyl phenol (about 10 mols ethylene oxide) | 12 | 12 | 16 | -- |
| Phosphate ester of ethoxylated dinonyl phenol (about 14 mols ethylene oxide) | -- | -- | -- | 12 |
| Water | 60 | 60 | 46 | 60 |

The lauric diethanolamine and oleic diethanolamide of Example 1 were employed in preparing the above compositions. The coconut oil diethanolamide employed in this example was the condensation product of about two mols of diethanolamide and one mol of the free acid form of coconut oil fatty acids.

EXAMPLE 3

| | Parts |
|---|---|
| Mineral oil 70 SUS @ 100° F. | 16 |
| Oleic diethanolamide | 4 |
| Lauric diethanolamide | 3 |
| Polyethylene glycol 400 monooleate | 3 |
| Sodium salt of a phosphate ester of nonyl phenol ethylene oxide adduct (about 10 mols ethylene oxide) | 10 |
| Water | 64 |

The above gel may be prepared as follows:

Mix the mineral oil, oleic diethanolamide, lauric diethanolamide, polyethylene glycol monooleate and phosphate ester together and heat to between about 90° C. and 95° C. Heat the water to between about 90° C. and 95° C. and then add the water slowly with mixing to the mineral oil mixture while maintaining the temperature at about 90° C.–95° C. When all the water has been added, discontinue heating and continue mixing until the temperature has cooled to about 65° C., at which time the emulsion can be poured.

The oleic diethanolamide and lauric diethanolamide of Example 1 were utilized in the compositions of this Example and of the following examples.

EXAMPLE 4

Clear, transparent mineral oil-water gels were produced by employing the process of Example 3 with the following ingredients:

|  | Parts | |
| --- | --- | --- |
| Mineral oil 70 SUS @ 100° F. | 16 | 16 |
| Lauric diethanolamide | 3 | 4 |
| Oleic diethanolamide | 4 | 4 |
| Polyethylene glycol 400 monooleate | 3 | 5 |
| Sodium salt of a phosphate ester of nonyl phenol ethylene oxide adduct (about 10 mols of ethylene oxide) | 12 | 12 |
| Water | 62 | 59 |

EXAMPLE 5

A transparent mineral oil-water gel suitable as a hair dressing preparation was produced by employing the process of Example 1 with the following ingredients:

Part A:                                                     Parts
  Mineral oil 70 SUS @ 100° F. _____ 16
  Lauric diethanolamide _____ 3
  Oleic diethanolamide _____ 4
  Hexadecyl alcohol _____ 4
  Polyethylene glycol 400 monooleate _____ 3

Part B:                                                     Parts
  Sodium salt of a phosphate ester of ethoxylated
    nonyl phenol (10 mols ethylene oxide) _____ 12
  Diethanolamine _____ 2
  Propylene glycol _____ 1
  Water _____ 55

EXAMPLE 6

A transparent mineral oil-water gel suitable as a hand cleanser was produced by employing the process of Example 1 with the following ingredients:

Part A:                                                     Parts
  Deodorized kerosene _____ 16
  Lauric diethanolamide _____ 3
  Oleic diethanolamide _____ 4
  Isopropylamine salt of dodecyl benzene sulfonate _ 2
  Hexadecyl alcohol _____ 4
  Polyethylene glycol 400 monooleate _____ 3

Part B:                                                     Parts
  Sodium salt of a phosphate ester of ethoxylated
    nonyl phenol (about 10 mols ethylene oxide) _ 12
  Diethanolamine _____ 2
  Propylene glycol _____ 1
  Water _____ 53

The isopropylamine salt of dodecyl benzene sulfonate was used in this example. Suitable for use in the compositions of the present invention are the lower amine or lower alkanolamine salts of mono alkyl benzene sulfonic acids and mono alkyl toluene sulfonic acids in which the alkyl radical, which may be linear or branched chain, contains predominately from 8 to 18 carbon atoms and, better still, from 11 to 15 carbon atoms. Amines or lower alkanolamines that can be utilized in preparing the salts are, by way of illustration, diethanolamine, triethanolamine, isopropanolamine, propylamine, isopropylamine, butylamine or isobutylamine. The aforesaid amine salts of mono alkyl aryl sulfonates are especially useful as gel clarifiers and stabilizers in preparing transparent mineral oil-water gels when low viscosity mineral oils such as kerosene are employed. In general, when the aforesaid amine salts of mono alkyl aryl sulfonates are employed, it is in an amount up to about 5%, preferably between about 1% to 4%, by weight of the total composition. Their use is not preferred for cosmetic applications where any possible skin irritation is to be avoided.

What is claimed is:

1. A substantially clear and transparent gel composition consisting of by weight—
   (a) from about 5% to about 25% of mineral oil;
   (b) from about 1% to about 5% of the water-soluble diethanolamide condensation product selected from the group consisting of the condensation product of about one mol of diethanolamine and one mol of the methyl esters of higher fatty acids selected from the group consisting of lauric acid, myristic acid and coconut oil fatty acids, and the condensation product of about two mols of diethanolamine and one mol of the free acid form of higher fatty acids selected from the group consisting of lauric acid, myristic acid and coconut oil fatty acids;
   (c) from about 1% to about 8% of the oil-soluble diethanolamide condensation product of about one mol of diethanolamine and one mol of the free acid form of normally liquid higher fatty acids;
   (d) from about 1% to about 5% of a polyhydroxy fatty acid monoester selected from the group consisting of polyglycerol monoesters of higher fatty acids, polyoxyethylene monoesters of higher fatty acids, and sugar and sugar alcohol monoesters of higher fatty acids;
   (e) from about 8% to about 20% of a phosphoric acid ester of the ethylene oxide adduct of a member selected from the group consisting of alkyl phenols in which the alkyl radicals contain a total of from 5 to 18 carbon atoms, aliphatic monohydric alcohols containing from 8 to 18 carbon atoms, and the water-soluble salts of said esters; and
   (f) from about 10% to about 65% of water.

2. A gel composition according to claim 1, in which the mineral oil has a viscosity of about 50 to 210 Saybolt seconds and comprises about 15 to 20%, the (b) ingredient is a diethanolamide of lauric acid, and the (c) ingredient is a diethanolamide condensation product of about one mol of diethanolamine and one mol of the free acid form of oleic acid or tall oil fatty acids.

3. A gel composition according to claim 1, in which the (a), (b), (c), (d), (e) and (f) ingredients are present in substantially the following percentages by weight:

(a) 15 to 20
(b) 3 to 4
(c) 4 to 6
(d) 3 to 4
(e) 10 to 16
(f) 40 to 60.

4. A gel composition according to claim 3, in which the phosphoric acid ester ingredient is a phosphoric acid ester of a 6 to 14 mol ethylene oxide adduct of an alkyl phenol in which the number of alkyl radicals is 1 or 2 and the total number of carbon atoms in said alkyl radicals is between 8 and 12.

5. A gel composition according to claim 3, in which the (d) ingredient is a $C_8$ to $C_{22}$ fatty acid monoester of a polyglycerol containing from 2 to 6 glycerine radicals.

6. A gel composition according to claim 3, in which the (d) ingredient is a $C_8$ to $C_{22}$ fatty acid monoester of a polyethylene glycol, said polyethylene glycol radical having a molecular weight in the range of about 200 to 2000.

7. In a method of making a gel composition corresponding to claim 1, the steps which comprise admixing the (a), (b), (c), and (d) ingredients, heating said first mixture to a temperature between about 75° C. and 100° C., admixing the (e) and (f) ingredients and heating said second mixture to a temperature between about 75° C. and 100° C., slowly adding with agitation the second mixture to the first mixture to form a third mixture while maintaining the temperature of said third mixture at a temperature between about 75° C. and 100° C., agitating said third mixture while cooling.

8. The method of claim 7 wherein the gel composition is substantially clear and transparent, the (b) ingredient is a diethanolamide of lauric acid, and the (c) ingredient is a diethanolamide condensation product of about one mol of diethanolamine and one mol of the free acid form of oleic acid or tall oil fatty acids.

9. The method of claim 7 in which ingredient (a) is deodorized kerosene and between about 1% to about 5% of the lower amine or lower alkanolamine salts of mono alkyl benzene sulfonic acids and mono alkyl toluene sulfonic acids is admixed with the (a), (b), (c) and (d) ingredients in the first mixture.

References Cited
UNITED STATES PATENTS

| | | | |
|---|---|---|---|
| 2,509,197 | 5/1950 | Borus et al. | 252—153 X |
| 3,004,056 | 10/1961 | Nunn et al. | 252—351 X |
| 3,101,301 | 8/1963 | Siegal et al. | 252—316 X |
| 3,341,465 | 9/1967 | Kaufman et al. | 252—316 |

RICHARD D. LOVERING, Primary Examiner

U.S. Cl. X.R.

252—137, 153, 312; 424—71